Nov. 8, 1932.  L. C. BENDIT  1,887,279

PULLEY

Filed Oct. 24, 1929

INVENTOR
Louis C. Bendit
BY
ATTORNEY

Patented Nov. 8, 1932

1,887,279

UNITED STATES PATENT OFFICE

LOUIS C. BENDIT, OF KANSAS CITY, MISSOURI

PULLEY

Application filed October 24, 1929. Serial No. 402,245.

My invention relates to pulleys and more particularly to metal sheaves having grooves in their peripheries, the principal objects of the invention being to simplify the construction of grooved metal sheaves and to reduce the expense of manufacture and assembly of a grooved sheave.

Steel pulleys have been made of relatively light material comprising metal rings having smooth faces. It has heretofore, however, been impracticable to form a grooved sheave of sheet metal, and grooved metal sheaves therefore have ordinarily comprised castings in which the groove-forming elements are integral with the rim and spokes of the wheel.

Further objects of my invention therefore are to apply groove-forming elements to a steel pulley whereby a relatively light pulley may be provided with grooves to form a light grooved sheave, to form a smooth pulley rim and a corrugated rim of light sheet material and attach the two to comprise a unit, and to reinforce the light walls of the grooves to sustain the pressure of belts operating on the sheave.

In accomplishing these and other objects of the invention, I have provided improved details of structure, the preferred forms of which are illustrated in the accompanying drawing, wherein.

Figure 1:
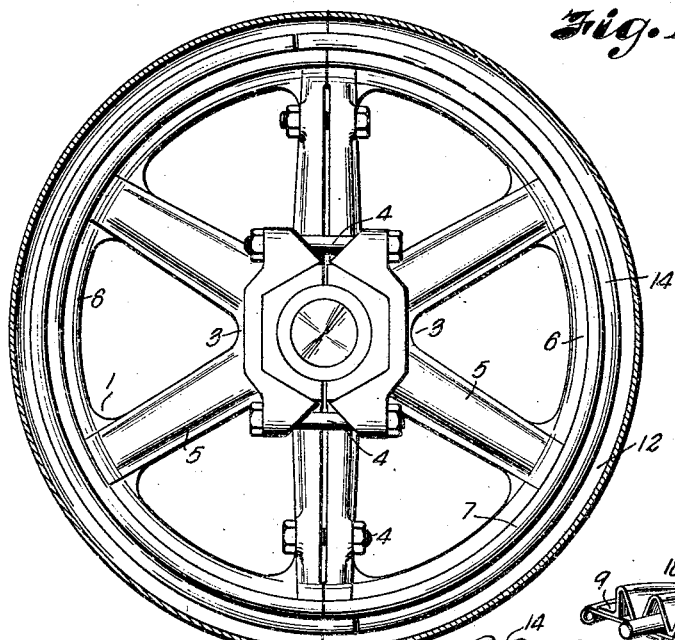
Fig. 1 is a side elevation of a pulley constructed in accordance with my invention, the corrugated rim being shown in section.
Figure 2:
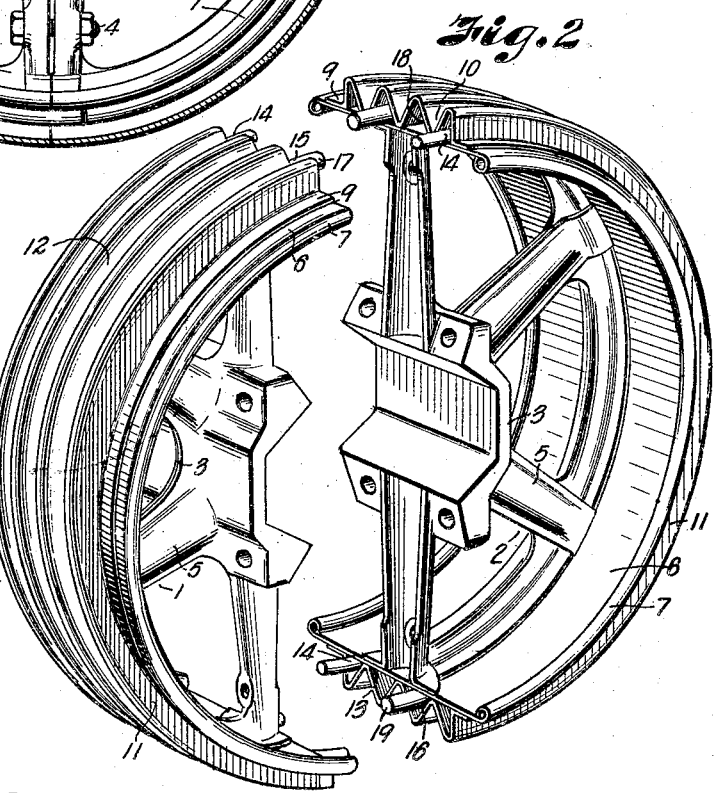
Fig. 2 is a perspective view of the two portions of a split pulley illustrated in spaced relation and constructed in accordance with my invention.
Figure 3:
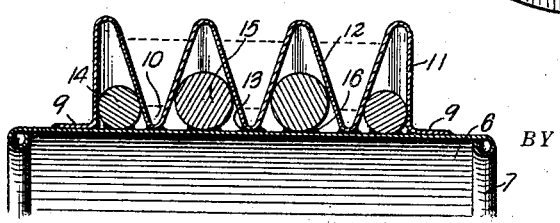
Fig. 3 is a section through a portion of the pulley on a plane including the axis of the pulley.

Referring in detail to the drawing:

1 and 2 designate mating halves of a split pulley including tubular hub shell portions 3 adapted to be secured together by bolts 4 to form a hub and join the halves of the pulley. The halves include spokes 5 and sheet metal rim members 6 having rolled tubular edges 7.

When connected and secured together, the halves form a relatively light pulley having a continuous rim, the face of the rim being smooth.

My invention pertains particularly to a supplemental rim comprising similar corrugated strips adapted to be mounted on the respective rim portions of the steel wheel including edge flanges 9 overlying the rims 6 adjacent the edges and secured thereto preferably by welding.

The corrugated rim members are formed of relatively light steel sheeting having regular V-shaped depressions or grooves 10 adapted for alignment upon assembly of the pulley members to form continuous annular grooves on the periphery of the pulley.

The strips are upturned at the inner edges of the flanges 9 to form substantially vertical walls 11 while the interior walls 12 formed by depressing the material to produce the grooves are inclined to confer the V-shaped character on the grooves.

The walls 11 and 12 are formed with relation to each other to bring the rib-like under surface to the sheet at the apices of the grooves into engagement with the face of the rims and are welded thereto as indicated at 13.

I further provide reinforcing members such as 14 and 15 located in the recesses formed by adjacent walls of the corrugated rim and fixed to the rim members 6 by welding indicated at 16. The reinforcing members are fixed to the rim members 6 before the corrugated rim is installed, the members 14 being relatively small to assure proper form for the outer walls 11 and adjacent inner inclined walls for engaging the same. The members 15 are relatively large to accommodate the larger recesses intermediate the side edges of the corrugated rim and adapted to assure engagement of the intermediate inclined walls with the reinforcing members.

The reinforcing members may be rod-like steel bars and preferably alternately project and are recessed with relation to the end edges of the halves of the pulley whereby a projecting end such as 17 of a bar located in one pulley section will extend into a recess 18 afforded in the corresponding corrugation of the opposite half owing to extension of the opposite end 19 of the reinforcing rod in said corrugation from the opposite edge of the pulley half.

In using the invention, a metal wheel provided with a smooth rim may be provided either in split or complete form to receive the corrugated rim. In the illustrated application of the invention, a split pulley is shown and the corrugated rim is provided in halves and fixed to the smooth peripheral surface of the rims of said halves. The reinforcing members are preferably welded to the rims of the split halves in suitable position for forming staggered projecting ends of rods and the corrugated strips are welded to the rim members with the corrugations overlying the reinforcing members and the walls of the corrugations engaging said members.

A relatively light weight wheel may thus be constructed and a corrugated rim may be applied to the smooth periphery of a wheel at relatively small cost to form a grooved sheave.

What I claim and desire to secure by Letters Patent is:

1. In a pulley including a wheel having a smooth rim, a series of cylindrical reinforcing members fixed to the rim in spaced relation forming peripheral bosses on the rim, and a groove-forming strip fixed to the wheel rim having V-shaped depressed portions extending between the reinforcing members to the wheel rim and fixed to the rim, the side walls of the strip forming the depressions engaging the reinforcing members, whereby stresses on the strip walls may be transmitted through the reinforcing members to the wheel.

2. A pulley including a wheel having a smooth rim, a series of rod-like reinforcing members mounted circumferentially on the rim in spaced relation, and a groove-forming strip to receive a belt, said strip having V-shaped depressed portions extending between the reinforcing members to the wheel rim, the inclined side walls of the depressed portions engaging the reinforcing members for transmitting belt stresses through the reinforcing members to the wheel.

3. A belt supporting pulley comprising in combination with a wheel having a smooth rim, a groove forming strip having edge flanges fixed to the wheel rim and V-shaped depressions producing inclined walls and forming inner ridges engaging the rim, and reinforcing members engaging the rim and the inclined walls of the strip for transmitting belt stresses on the strip walls to the wheel.

4. A split pulley comprising a pair of segmental sections, each section comprising a smooth rim and a hub joined by spokes, a series of rod-like members mounted circumferentially on the rim in spaced relation, and a groove-forming strip to receive a belt, said strip having V-shaped depressed portions extending between the reinforcing members to the wheel rim, the inclined side walls of the depressed portions engaging the reinforcing members for transmitting belt stresses through the reinforcing members to the wheel.

5. A split pulley comprising a pair of segmental sections, each section comprising a smooth rim and a hub joined by spokes, a groove-forming strip having edge flanges fixed to the wheel rim and V-shaped depressions producing inclined walls and forming inner ridges engaging the rim, and reinforcing members engaging the rim and said inclined walls for transmitting belt stresses on the strip walls to the wheel.

6. A split pulley comprising a pair of segmental sections, each section comprising a rim and a hub joined by spokes said rim having a smooth outer face, a groove-forming strip having edge flanges fixed to the wheel rim and V-shaped depressions forming inner ridges engaging the rim, reinforcing members engaging the strip and said outer face and acting to hold the two halves of the pulley in alignment.

7. A split pulley comprising a pair of segmental sections, each section comprising a smooth rim and a hub joined by spokes, a groove-forming strip having edge flanges fixed to the wheel rim and V-shaped depressions forming inner ridges engaging the rim, and common means for individually reinforcing each depression of the strip and for holding the two halves of the pulley in alignment.

8. A split pulley comprising segmental sections, each section having a smooth rim and a hub portion joined by spokes, a groove-forming strip having edge flanges fixed to the wheel rim, and longitudinal depressions forming both inner ridges engaging the rim and inner recesses between said ridges, and means extending into the inner recesses of adjoining sections for holding the sections in alignment.

9. A split pulley comprising segmental sections, each section having a smooth rim and a hub portion joined by spokes, a groove-forming strip having edge flanges fixed to the wheel rim and longitudinal depressions forming both inner ridges engaging the rim and inner recesses between said ridges, and longitudinal reinforcing members in said recesses engaging the rim and having portions projecting from one section and adapted to extend into aligning recesses of an adjoining section to hold said sections in alignment.

In testimony whereof I affix my signature.

LOUIS C. BENDIT.